June 24, 1930.  A. HANSEN  1,765,917
AIRCRAFT
Filed June 28, 1928
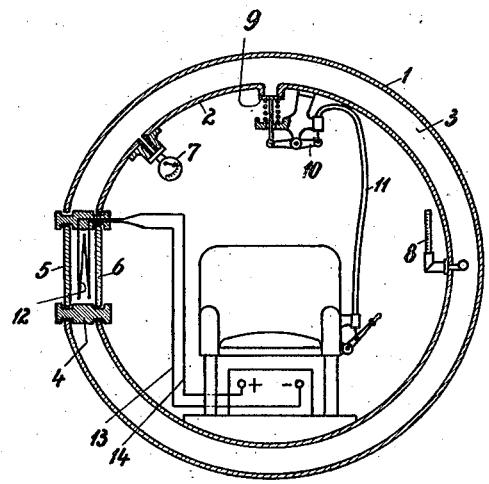
Inventor:
Asmus Hansen Patented June 24, 1930

1,765,917

UNITED STATES PATENT OFFICE

ASMUS HANSEN, OF BERLIN-SCHONEBERG, GERMANY

AIRCRAFT

Application filed June 28, 1928, Serial No. 288,825, and in Germany July 21, 1927.

My invention relates to aircraft and more particularly to the walls of aircraft. It is an object of my invention to so design the walls (which term shall also include doors, windows and other parts of aircraft walls), that the pressure and temperature in the compartments enclosed by such walls are not influenced detrimentally by variations of altitude. To this end, I form the walls enclosing such compartments, and more especially the cabin walls of at least two layers of gastight material which are resistive to tensile stresses and are arranged in spaced relation.

At high altitudes the walls of compartments such as the cabins of aircraft are subjected to tensile stresses by the pressure of the air in the compartments. As this pressure can never exceed one atmosphere, walls calculated with respect to such stress are so thin that it is difficult to keep the joints tight and that they are also liable to become damaged accidentally. However, failure of the walls at high altitudes is extremely dangerous as it will cause the death of the crew and passengers in the cabin.

In order to overcome this drawback I build up the wall of the cabin or other compartment of not less than two layers of gastight material which is capable of withstanding all tensile stresses occurring in the operation of the craft, these layers being arranged in spaced relation and the space enclosed between the layers constituting a gastight cell.

Preferably I provide suitable means, for instance valves operable from the pilot's seat, for controlling and regulating the pressure in the cell to keep it at a value intermediate the pressure of the air in the compartment, and the ambiant pressure.

If the cell is perfectly tight, the pressure therein must not be subject to variations. The fact that a variation occurs, indicates that the cell is leaky. Therefore means are preferably provided for indicating the pressure in the cell. A drop of pressure in the cell indicates that the outer layer is leaky, a rise indicates that the inner layer is leaky. By such indications the pilot is warned that he must take steps to remove the leakage or descend to lower altitudes.

If desired, the predetermined gas pressure in the cells can be maintained when the aircraft is not in operation so that a convenient expedient is thus provided for ascertaining tightness of the walls of the compartments before starting for a flight.

Instead of air the cells may be filled with some other suitable gas, or with a material which is a poor heat conductor in order to reduce the amount of heating required for the compartment. By suitably selecting the charge of gas in the cells it is also possible to eliminate the influence of cosmic radiation at high altitudes, and of other detrimental influence.

With the gas pressure in the cell regulated to the medium between the pressure in the compartment and the ambiant pressure the stresses acting on the layers constituting the wall are distributed in the most favorable manner.

Doors, windows and other parts of the walls may be provided with gas cells in a similar manner. As to the windows, a further advantage results from my invention in that it prevents the glass from getting foggy. Fogginess is due to the cooling of a moisture-containing gas below the dew point, and the glass will become foggy only if its temperature drops below the dew point. In the present instance the air in the compartment is not saturated with moisture so that fogginess will not occur if the glass is maintained at a slightly higher temperature than the air in the compartment. This is effected by heating the cell enclosed by the two window panes above the temperature of the compartment. It is also necessary to keep the window cell dry, as the heat flows from the cell to the panes, but this problem is readily solved by means available in the art, the volume of the window cells being only small.

When the temperature of the window cell exceeds that in the compartment or cabin, the temperature gradient of the outer pane with respect to the ambient air is so considerable that it will always be above the dew point of the air even if the air is oversaturated with moisture, as in a cloud, nor can frozen matter, such as ice or hail, adhere to the panes.

With a window having only a single pane the same effect, as with two panes and a cell between them, is achieved by embedding in the pane suitable heating means, for instance, a resistance wire.

In the drawing affixed to this specification and forming part thereof an aircraft wall embodying my invention is illustrated diagrammatically by way of example.

In the drawing, 1 is the outer and 2 is the inner layer, 3 being the gas cell enclosed between the layers, 4 is a window frame, 5 and 6 are the panes, 7 is a pressure gauge, 8 is a thermometer, 9 is a valve for connecting the air in the compartment with the cell, 10 is a lever for controlling the valve, 11 is a Bowden cable or other member by which the valve 9 can be operated for instance from the pilot's seat, 12 is a heating wire in the window cell, and 13, 14 are conductors for supplying current to this wire.

I wish it to be understood that I do not desire to be limited to the exact details of construtrion shown and described for obvious modifications will occur to a person skilled in the art.

I claim:—

1. An aircraft cabin comprising two substantially concentric hollow bodies having thin, rigid walls arranged in spaced relation, each of said walls being resistive to tensile stresses, arising from a difference of the inner atmospheric pressure against outer sub-atmospheric pressure, and means for controlling the pressure in the space enclosed between said walls, to maintain it intermediate the pressure in the cabin and the pressure of the outer air.

2. An aircraft cabin comprising two substantially concentric hollow bodies having thin, rigid walls arranged in spaced relation each of said walls being resistive to tensile stresses, arising from a difference of the inner atmospheric pressure against outer sub-atmospheric pressure, transparent panes in registering openings of said walls and means for maintaining both said panes at a temperature which is higher than the temperature in the cabin and the temperature of the outer air.

3. An aircraft cabin comprising two substantially concentric hollow bodies having thin, rigid walls arranged in spaced relation each of said walls being resistive to tensile stresses, arising from a difference of the inner atmospheric pressure against outer sub-atmospheric pressure, transparent panes in registering openings of said walls and means for drying and heating the gas filling the space between said panes.

In testimony whereof I affix my signature.

ASMUS HANSEN.